United States Patent [19]

Stacher

[11] Patent Number: 4,603,808
[45] Date of Patent: Aug. 5, 1986

[54] SUPER PLASTIC FORMING METHOD WITH HEAT TREATED SEALS

[75] Inventor: George W. Stacher, Westminster, Calif.

[73] Assignee: Rockwell International Corporation, El Segundo, Calif.

[21] Appl. No.: 631,376

[22] Filed: Jul. 16, 1984

[51] Int. Cl.⁴ .............................................. B23K 31/00
[52] U.S. Cl. .................................. 228/265; 228/173.2; 228/193
[58] Field of Search ..................... 228/44.3, 265, 173.2, 228/193; 277/180, DIG. 6

[56] References Cited

U.S. PATENT DOCUMENTS

| 3,920,175 | 11/1975 | Hamilton et al. | 228/173.2 |
| 4,068,853 | 1/1978 | Schnitzler | 277/DIG. 6 X |
| 4,155,571 | 5/1979 | Gastineau et al. | 277/180 X |
| 4,356,116 | 10/1982 | Beers | 277/DIG. 6 X |

Primary Examiner—Nicholas P. Godici
Assistant Examiner—Carmine Cuda
Attorney, Agent, or Firm—Charles T. Silberberg

[57] ABSTRACT

A forming method for sealing sheet structure between two forming members wherein the sheets are subjected to high process temperatures and a high pressure differential. The method includes a heat treatment of a flaked graphite seal material to a temperature in excess of the process temperature to remove volatile contaminants therefrom.

2 Claims, 1 Drawing Figure

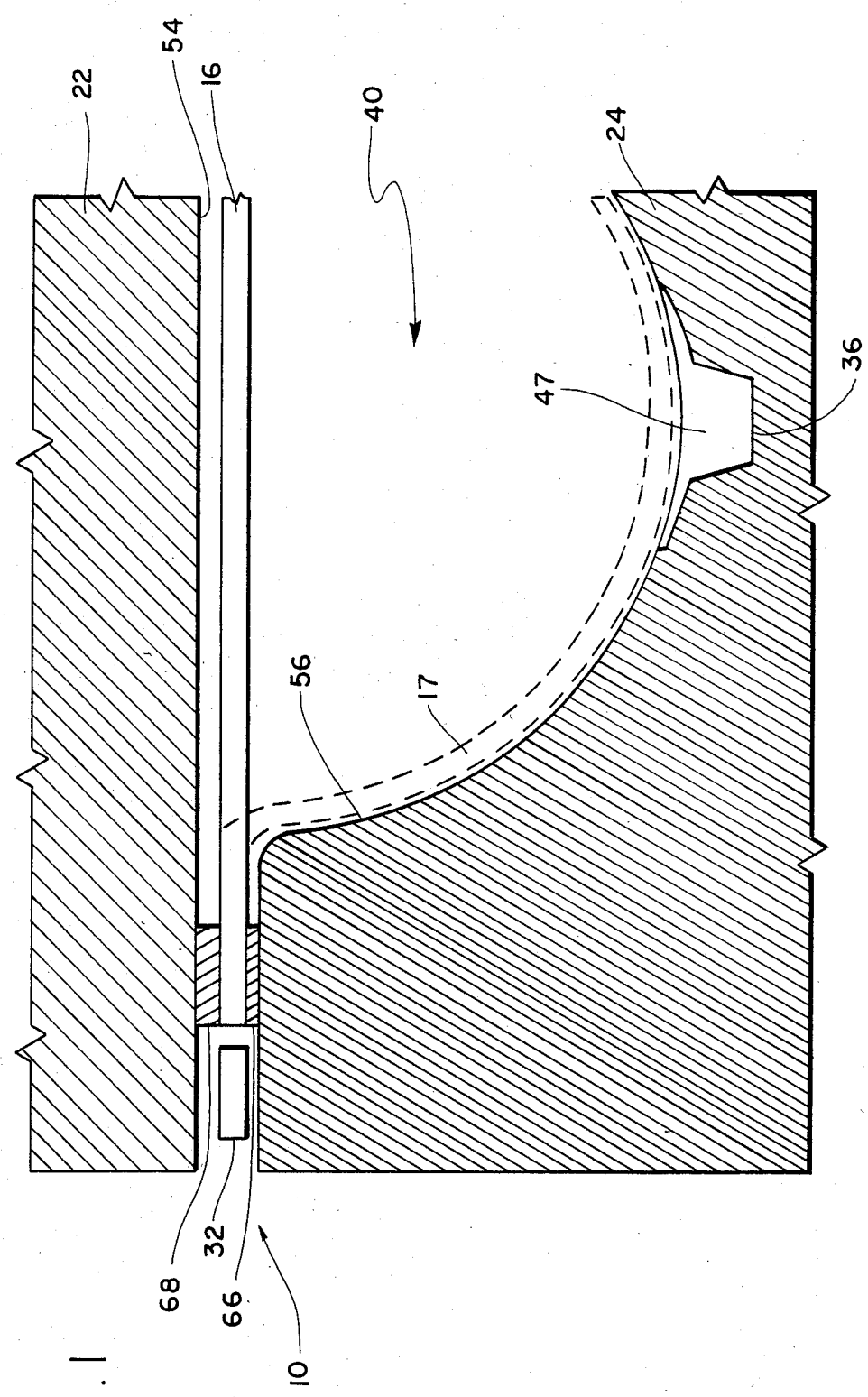

SUPER PLASTIC FORMING METHOD WITH HEAT TREATED SEALS

BACKGROUND OF THE INVENTION

The invention relates to heating and forming metallic sheet structure and more particularly to an improved tooling system and method for forming and/or bonding metallic structures. Normally, the forming is superplastic forming and the bonding is diffusion bonding.

Superplasticity is the property of a material to develop unusually high tensile elongations and plastic deformation with a reduced tendency towards necking within a limited temperature and strain rate range. This property is only exhibited by a limited number of metals and their alloys, such as titanium and its alloys, and aluminum and its alloys.

In superplastic forming a workpiece is heated until it becomes superplastic, after which differential pressure is applied causing the workpiece to stretch and form into a die cavity. The forming process is a complex one with critical parameters (time, temperature, and pressure) controlling the rate of stretching. Necking and ruptures are the direct result of exceeding the narrow tolerances of these parameters.

The process of superplastic forming (SPF) is disclosed in U.S. Pat. No. 3,934,441 to Hamilton et. al., entitled "Controlled Environment Superplastic Forming of Metals," which is incorporated into this specification by reference. The patent discloses an apparatus for the superplastic forming of reactive metals within a controlled environment, and a number of tool sealing techniques.

Bonding is the joining of similar or dissimilar metal surfaces together by placing the surfaces in direct contact and applying high pressures and heat. Although deformation bonding or solid state bonding are commonly used, diffusion bonding is preferred. Diffusion bonding (DB), as used herein, is the metallurgical joining of surfaces by applying heat and pressure for a sufficient time to cause commingling of the molecules at the joint interface. Diffusion bonding requires the intimate contact of clean mating surfaces to allow the intermolecular attractive forces to interact.

In many applications superplastic forming is combined with diffusion bonding (SPF/DB) because of the similarities in process pressures and temperatures. The SPF/DB process is disclosed in U.S. Pat. No. 3,920,175 entitled "Method for Superplastic Forming of Metals with Concurrent Diffusion Bonding," and U.S. Pat. No. 3,927,817, entitled "Method for Making Metallic Sandwich Structures," both to Hamilton, et al., and both being incorporated herein by reference.

U.S. Pat. No. 4,331,284 by Schulz, et. al. entitled "Method of Making Diffusion Bonded and Superplastically Formed Structures" discloses a tooling system. The upper forming member has a circular protrusion that surrounds the fluid line inlet and continuous frame protrusions that surrounds the perimeter of the sheets. Upon closing, the protrusions form indentations in the sheets, thereby providing circular seals around the fluid inlet lines and peripheral seals around the perimeter of the sheets. These seals were used because standard resilient seal materials tend to:

1. break down while subjected to high process temperatures and high pressure differentials;
2. be incompatible with sheet materials; and
3. contaminate the inert atmosphere at process temperatures.

However, these protruding seals may crush the inflation tubes and extrude the sheet material. In addition, leakage can occur during forming, thereby contaminating the forming chamber and damaging the formed structure.

SUMMARY

It is an object of the present invention to provide a new, improved tooling apparatus and method for bonding and/or forming sheet metal, which overcomes the aforementioned disadvantages at process temperatures and pressure differentials.

It is another object of the present invention to provide a tooling apparatus and method for bonding and/or forming sheet metal that avoids contamination of the tool atmosphere, a breakdown of the seal materials, and the undesired forming of the sheets around the seal area.

Briefly, tooling systems for forming sheet structure as used herein comprise two forming members (dies) which define a hollow cavity therebetween. The cavity is tightly sealed to allow for high pressure differentials to be applied within the cavity during forming/bonding. When one or more sheets are to be formed/bonded, a pressure differential is effected within the cavity (relative to opposite sides of the metal sheet or sheets). A kiss bar made of a high compressive strength material may be located adjacent to the seal to insure that the seal and the sheet structure can withstand the high compressive forces applied through the forming members during bonding/forming. The kiss bar acts as a stop to maintain the proper closure height, and to prevent flow forming or extrusion of the sheets around the seal area. The seal is made of flaked graphite which is heat treated to a temperature above process temperatures to drive out volatiles from the material.

The tooling apparatus is applicable to any superplastic forming, diffusion bonding, or superplastic forming/diffusion bonding process where a clean atmosphere is required. The apparatus is equally applicable to superplastic forming of titanium and its alloys, aluminum and its alloys, and other superplastic metals.

The novel features which are believed to be characteristic of the invention, both as to the apparatus and forming method, together with further objects and advantages thereof, will be better understood from the following description in connection with the accompanying drawing in which presently preferred embodiments of the invention are illustrated by way of example. It is to be expressly understood, however, that the drawing is for purposes of illustration and description only, and is not intended as a definition of the limits of the invention.

BRIEF DESCRIPTION OF THE DRAWING

FIG. 1 is a sectional fragmentary view of a tooling system, according to the present invention, which is to be used for SPF/DB, where the metal sheet is shown prior to forming in solid lines, and is shown after forming in broken lines.

DETAILED DESCRIPTION OF THE INVENTION

Referring now to the drawing, FIG. 1 illustrates an exploded, cross sectional view of apparatus 10 comprising the present invention.

In the preferred embodiment both superplastic forming and diffusion bonding are involved, and 6A1-4V titanium is the sheet material and the workpiece material. Forming members 22 and 24 have two opposed principle surfaces, 54 and 56, respectively. Surface 56 is shaped like a half hemisphere and together with surface 54 form a hollow cavity 40. During superplastic forming sheet 16 will contact forming member 24 and assume the shape of curved surface 56. Sheet 16 is formed in a controlled manner by using an inert gas environment. Workpiece 47, which fits into cutout portion 36 of die 24, is then bonded to formed sheet 16.

The sealing means consist of seals 66 and 68 and kiss bar 32. Forming members 22 and 24 close with a compressive force of at least 50,000 pounds and preferably about 135,000 pounds to effectively seal hollow cavity 40. A clean atmosphere is essential in the hollow cavity during the diffusion bonding. Seals 66 and 68 must be free of materials that could contaminate the controlled environment. Typically a pressure differential of at least 350 psi must be sustained in hollow cavity 40, whereas 600 psi is preferred.

A kiss bar 32 is made of a material such as 2249 steel, which will withstand these high compressive forces and acts as a stop to ensure the proper closure height. The height of kiss bar 32 is slightly larger than the thickness of sheet 16. During forming the seal material yields when subjected to the compressive forces and thereby effectively seals hollow chamber 40. Preferably, the seal material is flaked graphite and is commercially available from the Union Carbide Corporation, as #3481 GRAFOIL ® (expanded graphite material) seals. Flaking allows the graphite to yield and function as a seal when subjected to high compressive forces. A carbon type seal is used, since carbon maintains structural integrity at temperatures considerably higher than forming-/bonding temperatures, i.e., maintaining phase, shape, and strength characteristics. Metals progressively weaken at increasing temperatures, whereas many nonmetals (like carbon, silicon carbide, or silica) do not plastically deform even at temperatures near melting. These nonmetals maintain their structural integrity and may even improve strength properties at increasing temperatures.

Seals 66 and 68 are according to the present invention to be heat treated at high temperatures before they can be used for forming or bonding. The heat treating is necessary to insure that all potentially contaminating volatiles have been driven out of the seal materials and will not be released into the controlled environment during forming/bonding. Such environmental contamination could prevent diffusion bonding, or could contaminate the reactive metal sheet structure to be formed. Although the highest forming/bonding temperature may be adequate for the heat treating, a safety factor of a few hundred degrees is recommended. For example, if the sheet material is 6A1-4V titanium, the forming/bonding temperature range is 1450° F. to 1700° F., and so the preferred heat treating temperature for the seals is from 1900° F. to 2000° F. Similarly, if the sheet material is aluminum, the maximum forming-/bonding temperature is about 960° F., and so the preferred heat treat temperature for the seals is about 1200° F.

Surface 56 may be coated with a parting agent having a low coefficient of friction, such as boron nitride, prior to bonding and forming. The parting agent eases the separation of formed sheet 17 from surface 56 after forming.

While FIG. 1 depicts a hemispherical shaped structure, the tooling and method can be practiced to form other complex structural shapes. Furthermore, while a single sheet configuration is shown, multiple sheets can be used. If multiple sheets are used, the sheets are diffusion bonded together, and then superplastically formed to assume the shape of the cavity. The bonded sheets may be subsequently diffusion bonded to workpiece 47.

Accordingly, there has been provided, in accordance with the invention, a forming apparatus and method that fully satisfies the objectives set forth above. It is understood that all terms used herein are descriptive rather than limiting. While the invention has been described in conjunction with a specific embodiment, it is evident that many alternatives, modifications, and variations will be apparent to those skilled in the art in light of the disclosure herein. Hence, it is intended to include all such alternatives, modification, and variations that fall within the spirit and scope of the appended claims.

I claim:

1. A method of making metallic sheet structure by superplastic forming, which comprises: providing one or more metallic sheets, where at least one of said sheets possesses superplastic properties; providing first and second forming members which sandwich said one or more sheets, said first forming member having a cavity therein which defines a surface similar to the shape of said sheet structure desired to be formed; positioning one seal between said one or more sheets and said first forming member, and positioning a second seal between said one or more sheets and said second forming member, said seals being made of a seal material that is free of substances that will volatilize at superplastic forming conditions for said at least one sheet, said seal material being nonmetallic and maintaining structural integrity at high temperaturees and pressures of said forming conditions; applying compressive forces across said forming members to seal said cavity; bringing said at least one sheet to within a temperature range at which it exhibits superplastic characteristics; and applying pressure to said at least one sheet to superplastically form said at least one sheet into said cavity wherein said seal material is flaked graphite that has been heat treated to a temperature in excess of the superplastic forming temperature to be used for said at least one sheet to remove volatile contaminants therefrom.

2. The method of claim 1 wherein said structure is also to be formed by diffusion bonding, and said seal material has been heat treated to a temperature in excess of the greater of the superplastic forming and diffusion bonding temperatures to be used for said at least one sheet.

* * * * *